United States Patent
Nath

(10) Patent No.: US 11,509,633 B2
(45) Date of Patent: *Nov. 22, 2022

(54) DYNAMIC SECURITY APPROACH FOR WAIC BASEBAND SIGNAL TRANSMISSION AND RECEPTION

(71) Applicant: Rosemount Aerospace Inc., Burnsville, MN (US)

(72) Inventor: Pranay Kanti Nath, Karnataka (IN)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/724,557

(22) Filed: Dec. 23, 2019

(65) Prior Publication Data

US 2021/0119978 A1   Apr. 22, 2021

(30) Foreign Application Priority Data

Oct. 21, 2019  (IN) ............................. 201911042660

(51) Int. Cl.
*H04L 29/06* (2006.01)
*H04L 9/40* (2022.01)
(Continued)

(52) U.S. Cl.
CPC ........ *H04L 63/0428* (2013.01); *H04L 9/0869* (2013.01); *H04L 9/0877* (2013.01); *H04L 9/12* (2013.01)

(58) Field of Classification Search
CPC . H04L 63/0428; H04L 9/0869; H04L 9/0877; H04L 9/12; H04L 9/16;
(Continued)

(56) References Cited

U.S. PATENT DOCUMENTS 8,811,616 B2   8/2014 Cabos
9,178,567 B2   11/2015 Klein et al.
(Continued)

FOREIGN PATENT DOCUMENTS

EP   3767871         1/2021
WO   2004012384 A2   2/2004

OTHER PUBLICATIONS

Al-Ghamdi, Maimoona, Manal Al-Ghamdi, and Adnan Gutub. "Security enhancement of shares generation process for multimedia counting-based secret-sharing technique." Multimedia Tools and Applications 78.12 (2019): 16283-16310 (Year: 2019).*

(Continued)

*Primary Examiner* — Sanchit K Sarker
(74) *Attorney, Agent, or Firm* — Cantor Colburn LLP

(57) ABSTRACT

Provided are embodiments for performing encryption and decryption. Embodiments include generating a random key address, obtaining a pre-stored key using the random key address, and re-arranging portions of the pre-stored key using the random key address and a first enable signal. Embodiments also include selecting a dynamic logic operation based on the random key address and a second enable signal, receiving data for encryption, and combining portions of the received data for encryption with the re-arranged portions of the pre-stored key using the dynamic logic operation to produce encrypted data. Embodiments include re-arranging portions of the encrypted data based on the random key address and a third enable signal, and combining the re-arranged portions of the encrypted data with the random key address into an encrypted data packet for transmission. Also provided are embodiments for a transmitter and receiver for performing the encryption and decryption.

18 Claims, 13 Drawing Sheets

(51) Int. Cl.
*H04L 9/08* (2006.01)
*H04L 9/12* (2006.01)

(58) Field of Classification Search
CPC .. H04L 9/0861; H04L 9/0894; H04W 12/033; H04W 12/041; H04W 84/16
See application file for complete search history.

(56) References Cited

U.S. PATENT DOCUMENTS

| | | | |
|---|---|---|---|
| 9,323,499 B2 | 4/2016 | Hyde et al. | |
| 2002/0199131 A1* | 12/2002 | Kocin | H02J 7/34 714/14 |
| 2005/0226408 A1* | 10/2005 | Hotz | H04L 9/0662 380/28 |
| 2008/0072073 A1* | 3/2008 | Yang | G06F 21/79 713/193 |
| 2008/0192928 A1* | 8/2008 | Yu | G06F 21/85 711/E12.098 |
| 2008/0285747 A1* | 11/2008 | Kim | H04L 9/0894 380/44 |
| 2010/0211787 A1* | 8/2010 | Bukshpun | H04L 9/14 380/255 |
| 2011/0001531 A1* | 1/2011 | Nishi | H03L 7/143 327/162 |
| 2012/0306858 A1* | 12/2012 | Song | G09G 3/3225 345/204 |
| 2016/0335295 A1 | 11/2016 | Desai et al. | |
| 2018/0217942 A1 | 8/2018 | Fons et al. | |
| 2019/0319786 A1* | 10/2019 | Das | H04L 9/0833 |
| 2020/0252378 A1 | 8/2020 | Nath et al. | |
| 2021/0021992 A1 | 1/2021 | Nath et al. | |
| 2021/0119978 A1* | 4/2021 | Nath | H04L 9/12 |

OTHER PUBLICATIONS

Extended European Search Report for European Patent Application No. 20199931.5 dated Mar. 11, 2021, 7 pages.
Akram et al., "An Efficent, Secure and Trusted CHannel Protocol for Avionics Wireless Networks," Cornell University Library, Aug. 14, 2016, 10 pages.
European Search Report; European Application No. 19211155.7; Filed: Nov. 25, 2019; dated May 4, 2020; 11 pages.
Menezes et al., "Chapter 7: Block Ciphers" Handbook of Applied Cryptography; Press Series on Discrete Mathematices and its Applications, CRC Press, Oct. 1, 1996, pp. 223-282.
Smith et al., "Economy Class Crypto: Exploring Weak Cipher Usage in Avionic Communications via ACARS," International Conference on Financial Cryptography and Data Security, Dec. 23, 2017, pp. 285-301.
U.S. Final Office Action for U.S. Appl. No. 16/571,294, dated Dec. 2, 2021, 11 pages.
U.S. Non Final Office Action for U.S. Appl. No. 16/571,294, dated Jun. 21, 2021, 24 pages.
U.S. Notice of Allowance for U.S. Appl. No. 16/571,294, dated Feb. 16, 2022, 12 pages.

* cited by examiner

800

| Encryption | INPUT | | | | | OUTPUT | | | |
|---|---|---|---|---|---|---|---|---|---|
| Decryption | OUTPUT | | | | | INPUT | | | |
| Key Address[5:1] | KD [32:25] | KD [24:17] | KD [16:9] | KD [8:1] | | RK D4 | RK D3 | RK D2 | RK D1 |
| 0 | S | R | Q | P | | S | R | Q | P |
| 1 | S | R | Q | P | | S | R | Q | P |
| 2 | S | R | Q | P | | S | R | Q | P |
| 3 | S | R | Q | P | KEY BYTE REPLACEMENT LOGIC | S | R | P | Q |
| 4 | S | R | Q | P | | S | Q | R | P |
| 5 | S | R | Q | P | | S | Q | P | R |
| 6 | S | R | Q | P | | S | P | R | Q |
| 7 | S | R | Q | P | | S | P | Q | R |
| 8 | S | R | Q | P | | R | S | Q | P |
| 9 | S | R | Q | P | | R | S | P | Q |
| 10 | S | R | Q | P | | R | Q | S | P |
| 11 | S | R | Q | P | | R | Q | P | S |
| 12 | S | R | Q | P | | R | P | S | Q |
| 13 | S | R | Q | P | | R | P | Q | S |
| 14 | S | R | Q | P | | Q | S | R | P |
| 15 | S | R | Q | P | | Q | S | P | R |
| 16 | S | R | Q | P | | Q | R | S | P |
| 17 | S | R | Q | P | | Q | R | P | S |
| 18 | S | R | Q | P | | Q | P | S | R |

FIG. 8

| 19 | S | R | Q | P | Q | P | R | S |
|----|---|---|---|---|---|---|---|---|
| 20 | S | R | Q | P | P | S | R | Q |
| 21 | S | R | Q | P | P | S | R | Q |
| 22 | S | R | Q | P | P | S | Q | R |
| 23 | S | R | Q | P | P | S | Q | R |
| 24 | S | R | Q | P | P | R | S | Q |
| 25 | S | R | Q | P | P | R | S | Q |
| 26 | S | R | Q | P | P | R | Q | S |
| 27 | S | R | Q | P | P | R | Q | S |
| 28 | S | R | Q | P | P | Q | S | R |
| 29 | S | R | Q | P | P | Q | S | R |
| 30 | S | R | Q | P | P | Q | R | S |
| 31 | S | R | Q | P | P | Q | R | S |

| Dynamic Logic Operator | | | | |
|---|---|---|---|---|
| Key Address[9:6] | LO4 | LO3 | LO2 | LO1 |
| 0 | Xn | X | Xn | X |
| 1 | X | X | X | X |
| 2 | X | X | X | Xn |
| 3 | X | X | Xn | X |
| 4 | X | X | Xn | Xn |
| 5 | X | Xn | X | X |
| 6 | X | Xn | X | Xn |
| 7 | X | Xn | Xn | X |
| 8 | X | Xn | Xn | Xn |
| 9 | Xn | X | X | X |
| 10 | Xn | X | X | Xn |
| 11 | Xn | X | Xn | Xn |
| 12 | Xn | Xn | X | X |
| 13 | Xn | Xn | X | Xn |
| 14 | Xn | Xn | Xn | X |
| 15 | Xn | Xn | Xn | Xn |

FIG. 9

| | | | | | | | | |
|---|---|---|---|---|---|---|---|---|
| 19 | A | B | C | D | C | D | B | A |
| 20 | A | B | C | D | D | A | B | C |
| 21 | A | B | C | D | D | A | B | C |
| 22 | A | B | C | D | D | A | C | B |
| 23 | A | B | C | D | D | A | C | B |
| 24 | A | B | C | D | D | B | A | C |
| 25 | A | B | C | D | D | B | A | C |
| 26 | A | B | C | D | D | B | C | A |
| 27 | A | B | C | D | D | B | C | A |
| 28 | A | B | C | D | D | C | A | B |
| 29 | A | B | C | D | D | C | A | B |
| 30 | A | B | C | D | D | C | B | A |
| 31 | A | B | C | D | D | C | B | A |

| DYNAMIC ENCRYPTOR/DECRYPTOR SELECTOR | | | |
|---|---|---|---|
| Key Address[12:10] | EN3 | EN2 | EN1 |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

FIG. 11

DYNAMIC SECURITY APPROACH FOR WAIC BASEBAND SIGNAL TRANSMISSION AND RECEPTION

CROSS-REFERENCE TO RELATED APPLICATIONS

This application claims the benefit of Indian Application No. 201911042660 filed Oct. 21, 2019, which is incorporated herein by reference in its entirety.

BACKGROUND

The present invention generally relates to communications, and more specifically to techniques wireless baseband signal transmission with dynamic control logic to improve security robustness.

Wireless avionics intra-communication (WAIC) technology can be used in different environments for communicating various information. For example, WAIC can be used in an aircraft environment to communicate sensor information such as that related to temperature, pressure, airflow, etc. However, data must be exchanged in a secure fashion to ensure that the data is not intercepted. There may be a need to efficiently secure wireless data that is transmitted in various environments.

BRIEF DESCRIPTION

According to an embodiment, a method for encryption is provided. The method includes a method for encryption, the method includes generating a random key address; obtaining a pre-stored key using the random key address; re-arranging portions of the pre-stored key based on the random key address and a first enable signal; selecting a dynamic logic operation based on the random key address and a second enable signal; receiving data for encryption; combining portions of the received data for encryption with the re-arranged portions of the pre-stored key using the dynamic logic operation to produce encrypted data; re-arranging portions of the encrypted data based on the random key address and a third enable signal, wherein the first enable signal, the second enable signal and the third enable signal is determined by a dynamic encryption selector; and combining the re-arranged portions of the encrypted data with the random key address into an encrypted data packet for transmission.

In addition to one or more of the features described herein, or as an alternative, further embodiments include using a random number generator that generates a 12-bit random key address.

In addition to one or more of the features described herein, or as an alternative, further embodiments include using a first portion of the random key address to generate key displacement logic to re-arrange portions of the pre-stored key, where the first portion of the random key address is used to perform byte displacement of the combined data.

In addition to one or more of the features described herein, or as an alternative, further embodiments include using a second portion of the random key address to generate a dynamic logic operator used to encrypt the data.

In addition to one or more of the features described herein, or as an alternative, further embodiments include using a third portion of the random key address to generate the first enable signal, the second enable signal, and a third enable signal, wherein the first portion, the second portion, and the third portion of the random key do not overlap.

In addition to one or more of the features described herein, or as an alternative, further embodiments include implementing a hardware-based encryption.

In addition to one or more of the features described herein, or as an alternative, further embodiments include using the encrypted data packet to communicate in an avionics system.

According to another embodiment, a method for decryption is provided. The method includes receiving an encrypted data packet, wherein the data packet includes a random key address and encrypted data; obtaining a pre-stored key using the random key address; determining an arrangement of the pre-stored key used during encryption based on the random key address and a first enable signal; selecting a dynamic logic operation used during encryption based on the random key address and a second enable signal; determining an arrangement of portions of the encrypted data used during encryption based on the random key address and a third enable signal, wherein the first enable signal, the second enable signal and the third enable signal is determined by a dynamic encryption selector; and combining the arrangement of the pre-stored key with the arrangement of the portions of the encrypted data using the selected dynamic logic operation to decrypt the encrypted data.

In addition to one or more of the features described herein, or as an alternative, further embodiments include using a random key that is generated at a different device.

In addition to one or more of the features described herein, or as an alternative, further embodiments include using a first portion of the random key address to generate key placement logic to arrange portions of the pre-stored key, where the first portion of the random key address is used to perform byte placement of the combined data.

In addition to one or more of the features described herein, or as an alternative, further embodiments include using a second portion of the random key address to generate a dynamic logic operator used to decrypt the encrypted data.

In addition to one or more of the features described herein, or as an alternative, further embodiments include using a third portion of the random key address to generate the first enable signal, the second enable signal, and a third enable signal, wherein the first portion, the second portion, and the third portion of the random key do not overlap.

In addition to one or more of the features described herein, or as an alternative, further embodiments include implementing hardware-based decryption.

In addition to one or more of the features described herein, or as an alternative, further embodiments include using the decrypted data packet to communicate in an avionics system.

According to another embodiment, a system used for encryption and decryption of packets is provided. The system includes a transmitter configured to: generate a random key address; obtain a pre-stored key using the random key address; re-arrange portions of the pre-stored key based on the random key address and a first enable signal; select a dynamic logic operation based on the random key address and a second enable signal; receive data for encryption; combine portions of the received data for encryption with the re-arranged portions of the pre-stored key using the dynamic logic operation to produce encrypted data; re-arrange portions of the encrypted data based on the random key address and a third enable signal, wherein the first enable signal, the second enable signal and the third enable signal is determined by a dynamic encryption selector; and combine the re-arranged portions of the encrypted data with the random key address into an encrypted data packet for transmission. The system also includes a receiver configured to: receive the encrypted data packet, wherein the data packet includes the random key address and the encrypted data; obtain the pre-stored key using the random key address; determine an arrangement of the pre-stored key used the transmitter during encryption based on the random key address and the first enable signal; select a dynamic logic operation used by the transmitter during encryption based on the random key address and the second enable signal; determine an arrangement of portions of the encrypted data by the transmitter used during encryption based on the random key address and the third enable signal; and combine the arrangement of the pre-stored key with the arrangement of the portions of the encrypted data using the selected dynamic logic operation to decrypt the encrypted data.

In addition to one or more of the features described herein, or as an alternative, further embodiments include a transmitter that includes a random number generator to generate a 12-bit random key address.

In addition to one or more of the features described herein, or as an alternative, further embodiments include using a first portion of the random key address to generate key displacement logic to re-arrange portions of the pre-stored key, where the first portion of the random key address is used to perform byte displacement of the combined data.

In addition to one or more of the features described herein, or as an alternative, further embodiments include using a second portion of the random key address to generate a dynamic logic operator used to encrypt the data.

In addition to one or more of the features described herein, or as an alternative, further embodiments include using a third portion of the random key address to generate the first enable signal, the second enable signal, and a third enable signal, wherein the first portion, the second portion, and the third portion of the random key do not overlap.

In addition to one or more of the features described herein, or as an alternative, further embodiments include implementing hardware-based encryption and hardware-based decryption.

Technical effects of embodiments of the present disclosure include a hardware solution configured to increase wireless security of data.

The foregoing features and elements may be combined in various combinations without exclusivity, unless expressly indicated otherwise. These features and elements, as well as the operation thereof, will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 8 depicts a table of an example configuration for the key byte replacement logic in accordance with one or more embodiments;

FIG. 9 depicts a table of an example configuration for the dynamic logical operators in accordance with one or more embodiments;

FIG. 11 depicts a table of an example configuration for a dynamic encryptor/decryptor selector table in accordance with one or more embodiments.

DETAILED DESCRIPTION

WAIC has been allocated frequency spectrum of 4.2 to 4.4 GHz by the ITU. Encryption is possible using software or hardware techniques. Hardware encryption is considered to be safer and much more difficult to intercept. Encryption according to the techniques described herein occurs in the hardware chip level. A random number generator generates a key address which is used to index into one or more tables that are stored at both the transmitter and receiver to perform the encryption and description, respectively. By avoiding the transmission of the encryption key and using a random key instead the security of the encryption is increased.

Figure 1:
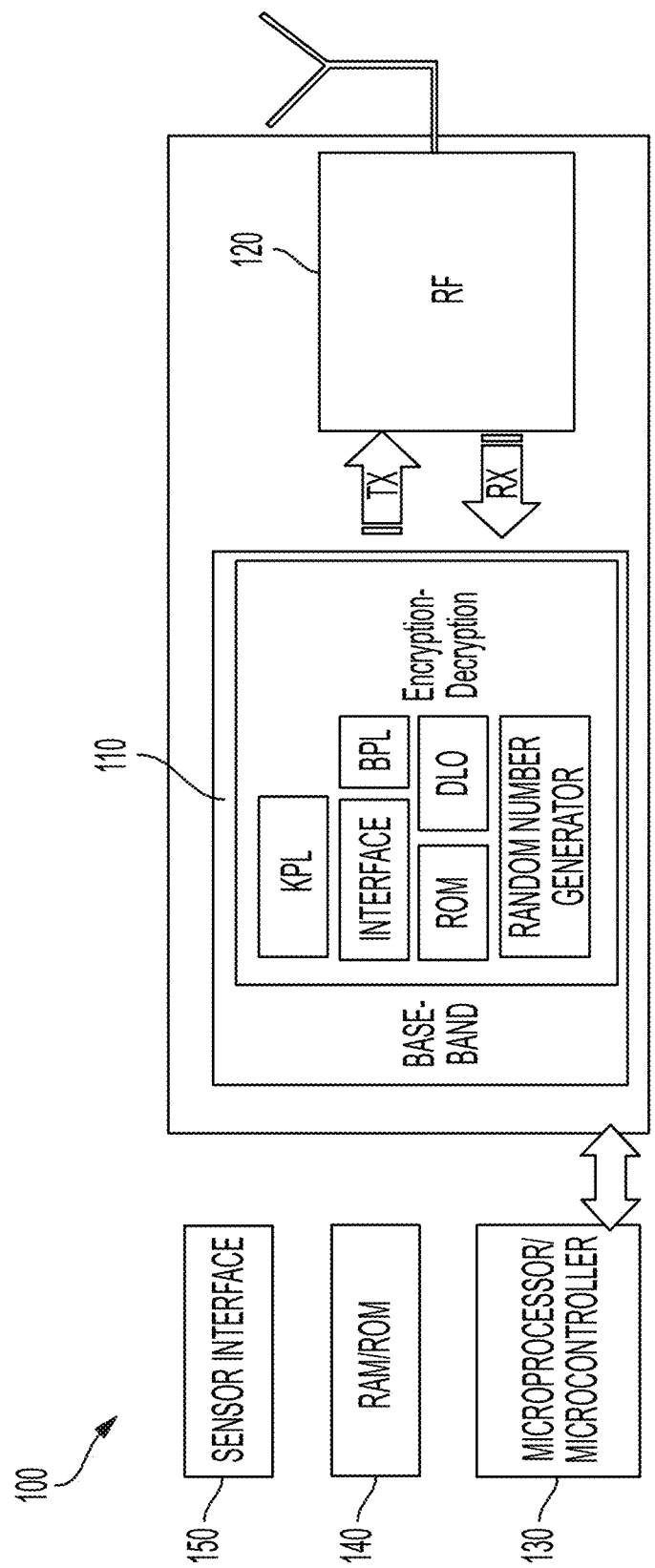
FIG. 1 depicts a transmitter for encrypting data in accordance with one or more embodiments.

In FIG. 1, a device 100 for performing encryption-decryption in accordance with one or more embodiments is shown. As shown, wireless transmitter device 100 (hereinafter referred to as transmitter 100) includes a baseband module 110. The baseband module 110 includes a random number generator. In one or more embodiments, the random number generator generates 12-bit random key address which is used to generate an address for a 4 k memory location of the on-chip memory ROM to get a pre-stored 32-bit key. The transmitter 100 includes a key displacement logic (KPL). The key displacement logic is used to re-arrange portions of the obtained pre-stored key. In one example, the pre-stored 32-bit key can be divided into four 1-byte (8-bits) chunks where each byte can be re-arranged which is further discussed with reference to FIGS. 4 and 5.

The transmitter 100 includes a dynamic logic operator (DLO). The dynamic logic operator provides different combinations of logical operations using operators such as the XNOR or XOR logic to encrypt the data. The combinations can be selected by the dynamic logic operator using a portion of the 12-bit key address.

The transmitter 100 also includes an RF module, ROM, and interface. The transmitter 100 includes a microprocessor/microcontroller 130, RAM/ROM 140, and sensor interface 150. It should be understood the transmitter 100 can include other modules and components.

Figure 2:
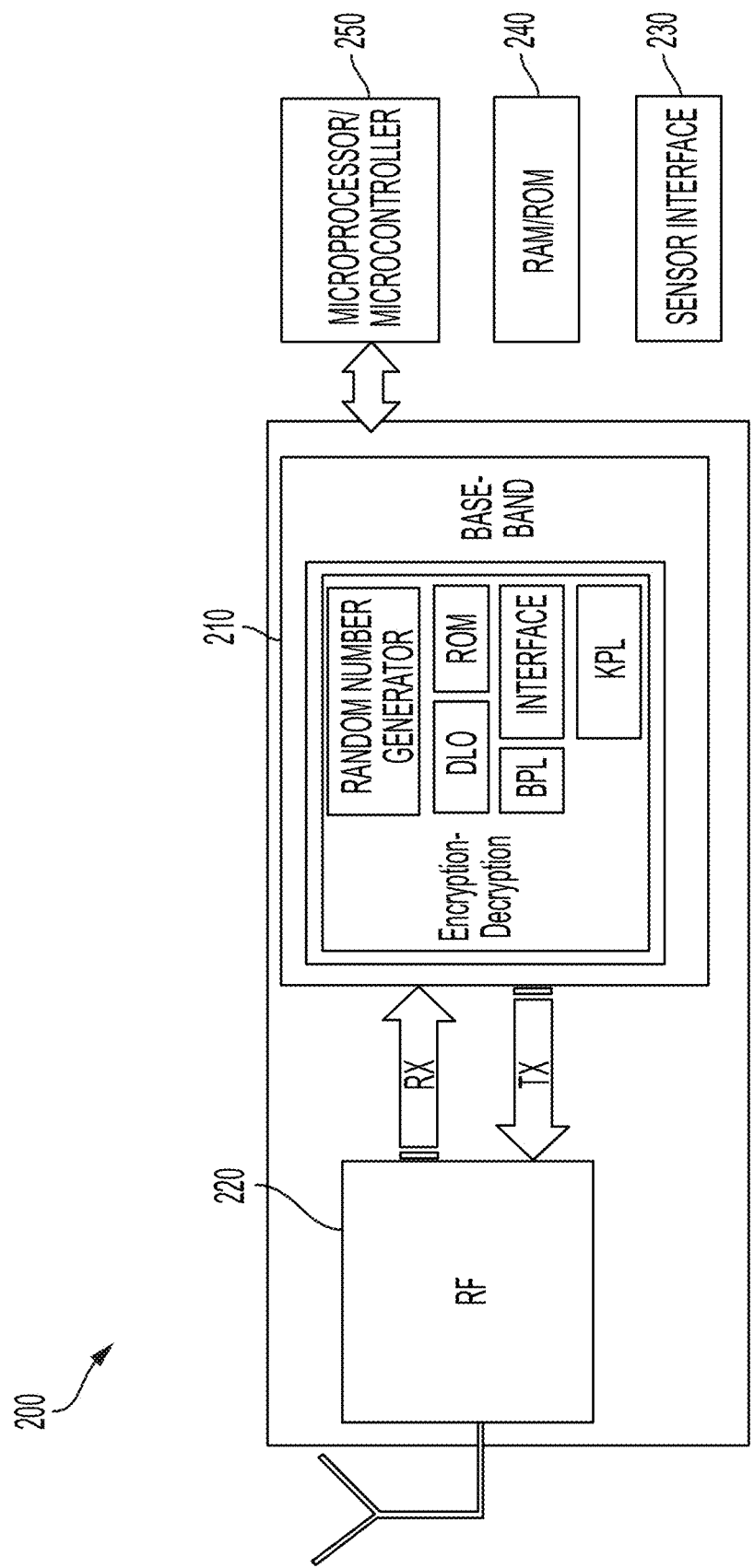
FIG. 2 depicts a receiver for decrypting data in accordance with one or more embodiments.
Figure 3:
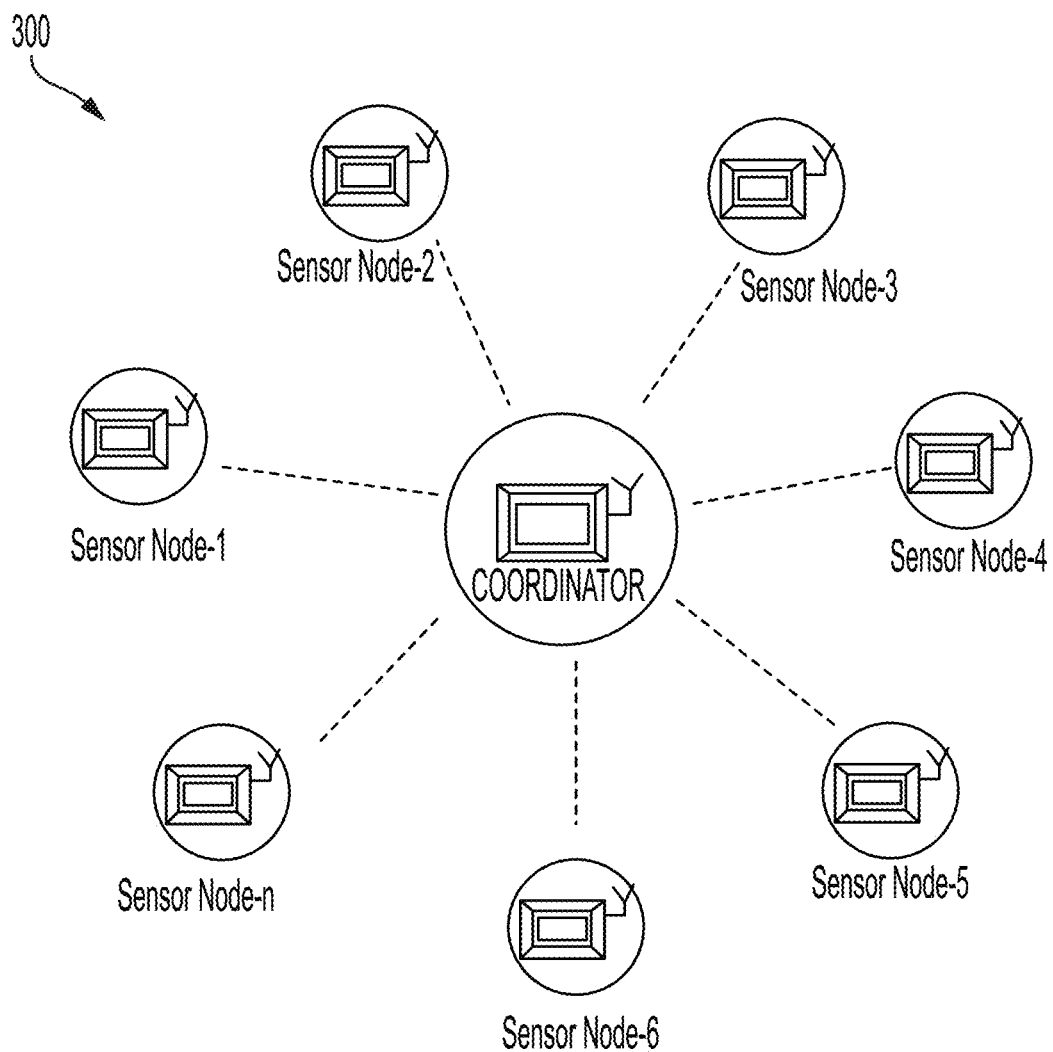
FIG. 3 depicts a system in accordance with one or more embodiments.

FIG. 2 depicts a receiver for performing decryption in accordance with one or more embodiments. As shown, the receiver 200 includes similar components as the transmitter 100 shown in FIG. 1. For example, the receiver 200 includes a baseband module 210. The receiver 200 is configured to with the same tables that are used to encrypt the data packet and is operated to reverse the encryption process based on the key address generated by the random number generator of the transmitter 100. The decryption process is discussed with reference to FIGS. 6 and 7. The receiver 200 also includes an RF module, ROM, and interface. The receiver 200 includes a microprocessor/microcontroller 230, RAM/ROM 240, and sensor interface 250. It should be understood the receiver 200 can include other modules and components FIG. 3 depicts a system for communicating using the encryption-decryption techniques in accordance with one or more embodiments. The sensor nodes 1-6 can correspond to sensors of an avionics sensor that can be used to communicate various data to an aircraft such as temperature, pressure, airflow data, etc. The coordinator of FIG. 3 can correspond to an aircraft controller that is configured to communicate wirelessly with the sensor nodes 1-6 and other systems.

Figure 4:
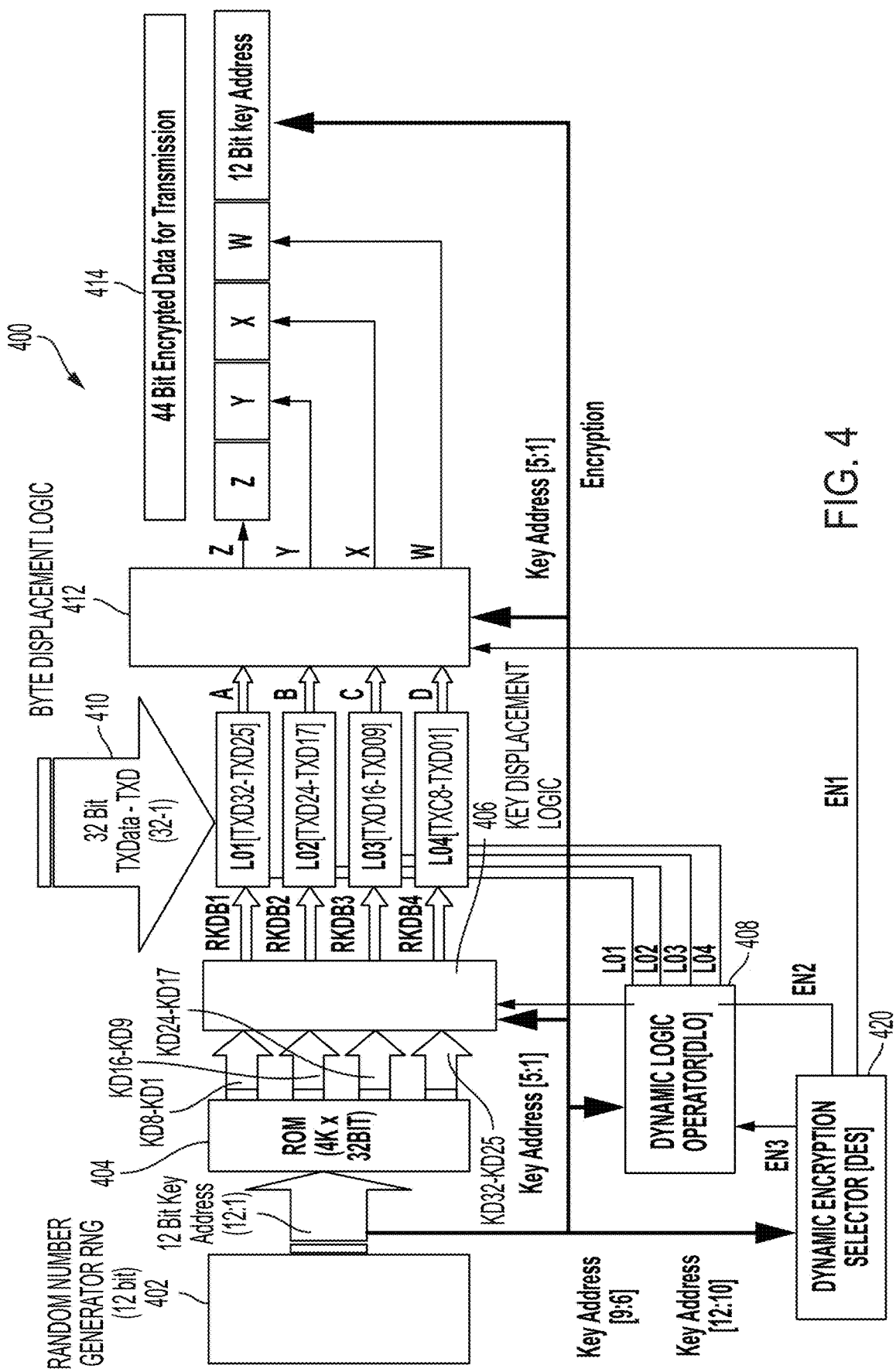
FIG. 4 depicts an encryption process for encrypting data in accordance with one or more embodiments.

Now referring to FIG. 4, an encryption process 400 for encrypting data in accordance with one or more embodiments is shown. The random number generator 402 is used to generate a 12-bit key address which is used to obtain a pre-stored key from the ROM 404. As shown, the pre-stored key from the ROM 404 can be divided into four 1-byte portions (KD8-KD1; KD16-KD9; KD24-KD17; KD32-KD25). The key displacement logic 406 re-arranges the 1-byte portions using the key address. In one example, the key displacement logic 406 uses bits [5:1] of the key address to obtain the key displacement information from a table such as table 800 shown in FIG. 8. Table 800 shown how each byte is mapped after the replacement logic which is based on the key address.

Figure 10:
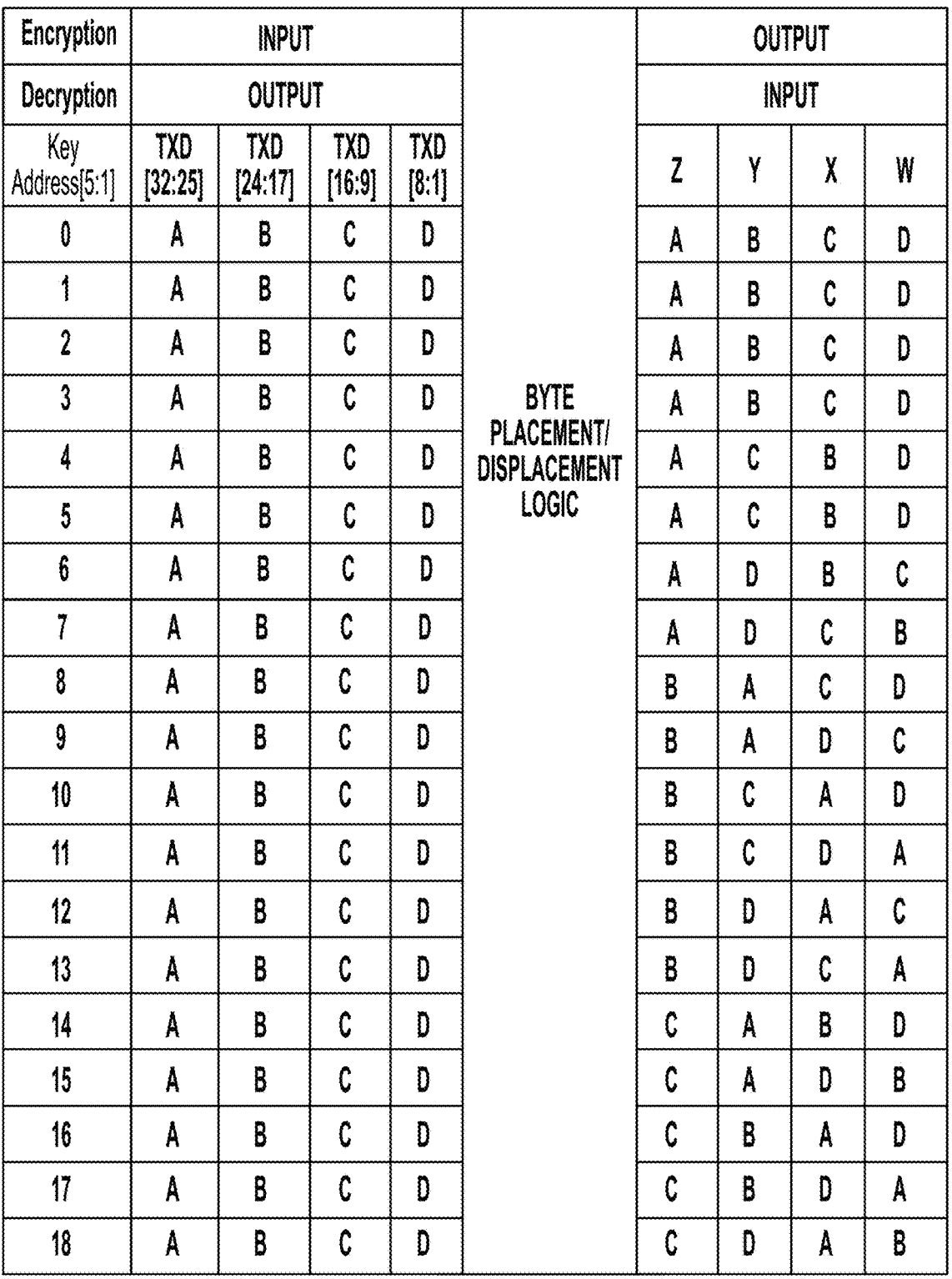
FIG. 10 depicts a table of an example configuration for a byte placement and displacement logic displacement in accordance with one or more embodiments.

The dynamic logic operator 408 uses part of the key address to select the dynamic operation to encrypt the transmission data 410. For example, bits [9:6] are used to select the operation according to table 900 shown in FIG. 9. The table includes XNOR (Xn) and XOR (X) logic for each logical operator LO4, LO3, LO2, and LO1. As shown in FIG. 4, each byte of the displaced key is combined with a byte of the transmission data 410 according to the corresponding logical operator to generate encrypted data A, B, C, and D. Subsequently each portion of the encrypted data is provided to the byte displacement logic 412 which re-arranges the encrypted data based on a portion of the key address [5:1]. For example, A, B, C, and D are mapped to Z, Y, X, and W, respectively. The table 1000 of FIG. 10 can be used to generate the various placements for the portions of data.

The dynamic encryption selector 420 is configured to generate an "Enable" signal that is provided to the key displacement logic 406, the dynamic logic operator 408, and the byte displacement logic 412. By selectively enabling the different encryption algorithms for the key displacement logic 406, the dynamic logic operator 408, and the byte displacement logic 412, each packet can be encrypted 8 different ways. This improves the security of the encrypted packet. The selection is configured as shown in the table 1100 of FIG. 11. In one or more embodiments of the disclosure, the upper portion of the key address [12:10] is used to index into the table 1100 to determine the enable signals EN1, EN2, and EN3. The enable signal EN1 is provided to the byte displacement logic 412 to enable the byte displacement of the data according to the table 1100. The enable signal EN2 is provided to the key displacement logic 406 to enable the key displacement of the key according to the table 1100. The enable signal EN3 is provided to the dynamic logic operator 408 to enable the byte displacement according to the table 1100.

Figure 5:
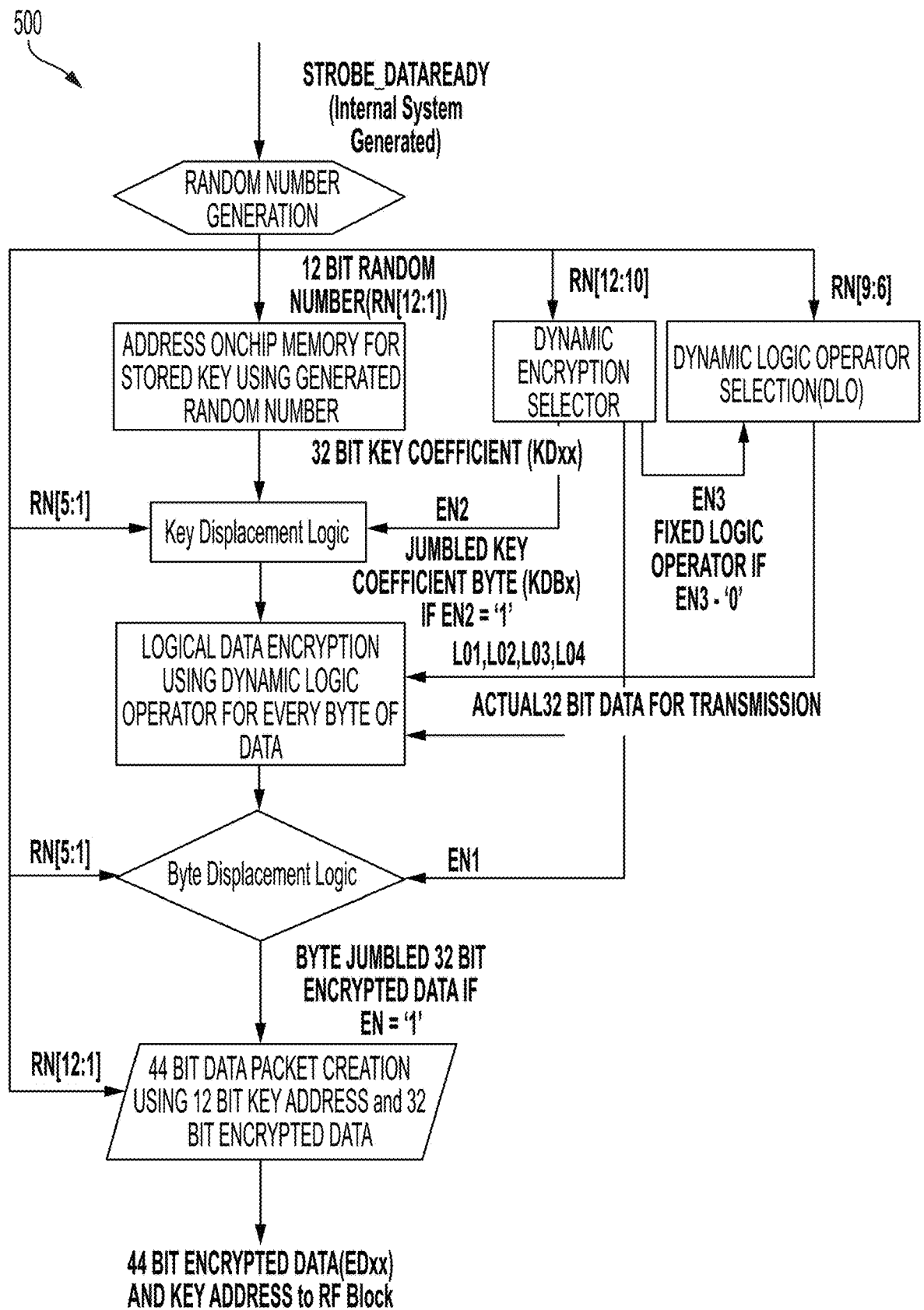
FIG. 5 depicts a flowchart of a process for encrypting data in accordance with one or more embodiments.

Finally, each portion of the encrypted data is combined with the key address to form the packet 414 for transmission. FIG. 5 provides a flowchart of the encryption process 500 that occurs in FIG. 4.

Figure 6:
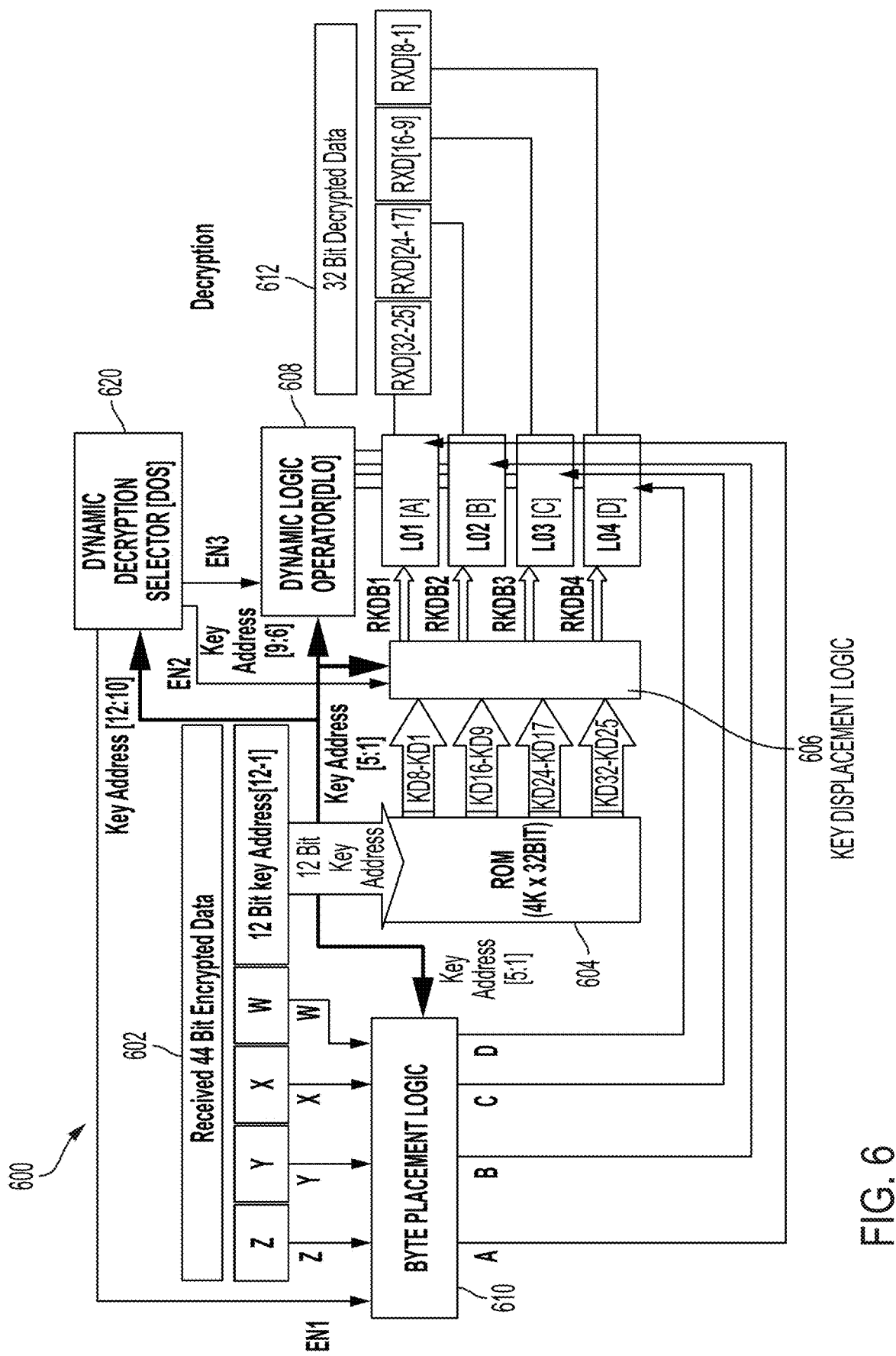
FIG. 6 depicts a decryption process for decrypting data in accordance with one or more embodiments.

Now referring to FIG. 6, a decryption process 600 in accordance with one or more embodiments is shown. The encrypted packet 602 is received which includes the encrypted data Z, Y, X, and W and the key address. The key address is used to access the pre-stored key from the ROM 604, the byte placement logic for the data packets, the key placement for the pre-stored key, the dynamic logic operators and the dynamic decryption selector 620 that were used by the transmitter 100 to encrypt the data. As shown in FIG. 6, the key address is used to obtain the pre-stored key from the table 800 shown in FIG. 8 and obtains the portions of the pre-stored key (KD8-KD1; KD16-KD9; KD24-KD17; KD32-KD25). The dynamic decryption selector 620 uses a portion of the key address [12:10] to determine which "Enable" signals EN1, EN2, EN3 were used in the encryption process. The "Enable" signals EN1, EN2, EN3 are used in the decryption process according to the table 1100 shown in FIG. 11. The key placement logic 606 uses the key address [5:1] to re-arrange the pre-stored key. In one or more embodiments, the key placement logic 606 also uses the enable signal EN2 in the decryption process. The dynamic logic operator 608 uses a portion of the key address [9:6] to select the logic operators that were used to encrypt the data by the transmitter 100. The dynamic logic operator 608 uses the key address and the enable signal EN3 to perform the operation according to table 900 shown in FIG. 9.

Figure 7:
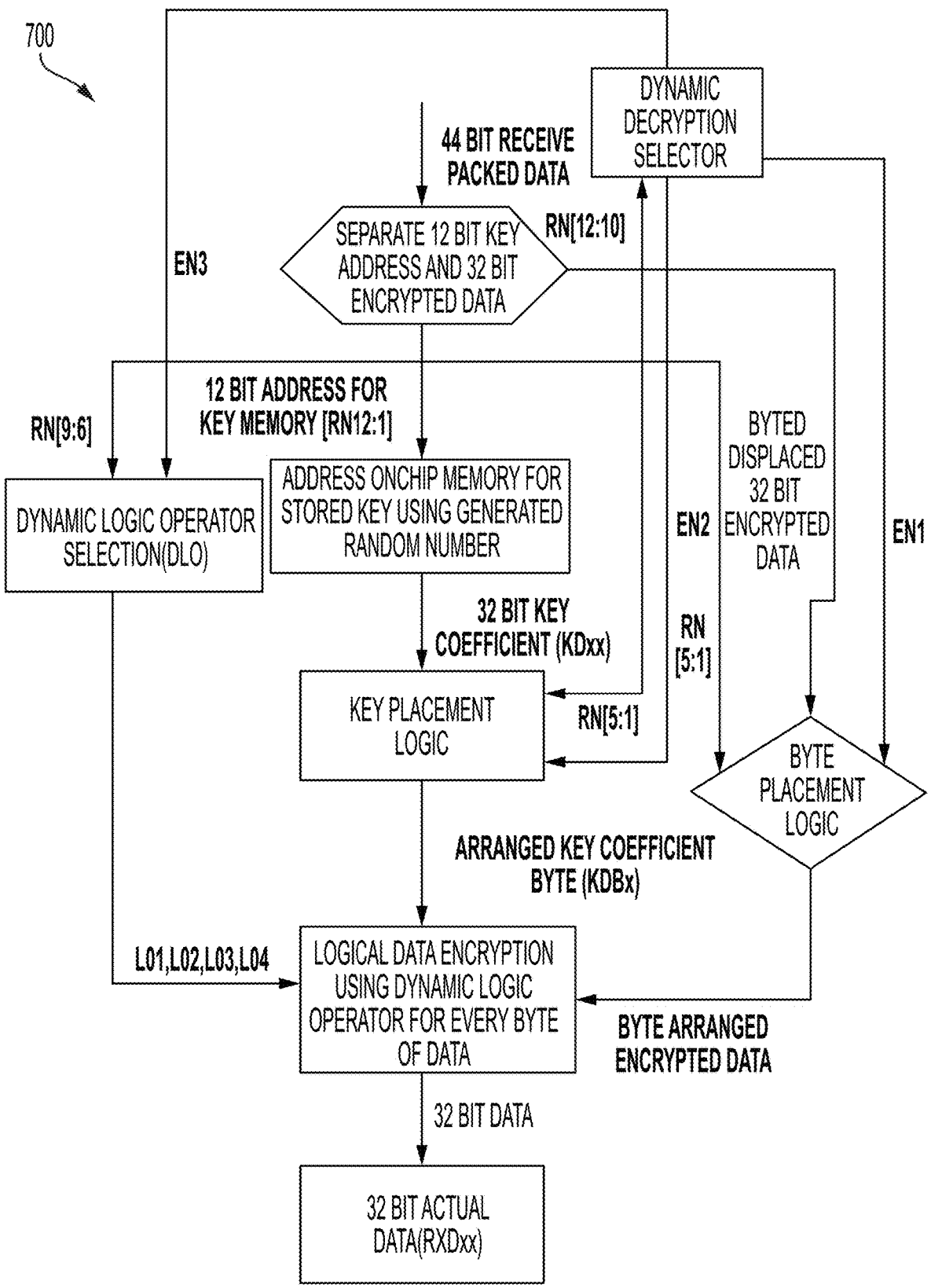
FIG. 7 depicts a flowchart of a process for decrypting data in accordance with one or more embodiments.

The byte placement logic 610 uses a portion of the key address [5:1] and the enable signal EN1 to re-arrange the packet data prior to performing the decryption. The byte placement logic 610 refers to the table 1000 of FIG. 10 to determine the proper placement of the data. The decryption is performed by combining the re-arranged portions of the pre-stored key with the re-arranged encrypted data using the corresponding logical operator to obtain the decrypted packet 612. A flowchart 700 is shown in FIG. 7 depicting the decryption process 600.

The technical effects and benefits include implementing a hardware encryption-decryption solution for wireless communication in a system such as an avionics system. The technical effects and benefits include using on-chip programmable keys which provide an indirect way of accessing the digital keys used for encryption-decryption. This provides a hardware solution that is very efficient and difficult to intercept. In an aircraft environment, each of the aircraft can be configured with a separate set of keys.

A detailed description of one or more embodiments of the disclosed apparatus and method are presented herein by way of exemplification and not limitation with reference to the Figures.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for encryption, the method comprising:
   generating a random key address, wherein the random key address is a 12-bit random key address;
   obtaining a pre-stored key using the random key address;
   re-arranging portions of the pre-stored key based on the random key address and a first enable signal;
   selecting a dynamic logic operation based on the random key address and a second enable signal;
   receiving data for encryption;
   combining portions of the received data for encryption with the re-arranged portions of the pre-stored key using the dynamic logic operation to produce encrypted data;
   re-arranging portions of the encrypted data based on the random key address and a third enable signal, wherein the first enable signal, the second enable signal and the third enable signal is determined by a dynamic encryption selector; and
   combining the re-arranged portions of the encrypted data with the random key address into an encrypted data packet for transmission.

2. The method of claim 1, wherein a first portion of the random key address is used to generate key displacement logic to re-arrange portions of the pre-stored key, and the first portion of the random key address is used to perform byte displacement of the combined data.

3. The method of claim 2, wherein a second portion of the random key address is used to generate a dynamic logic operator used to encrypt the data.

4. The method of claim 3, wherein a third portion of the random key address is used to generate the first enable signal, the second enable signal, and a third enable signal, wherein the first portion, the second portion, and the third portion of the random key do not overlap.

5. The method of claim 1, wherein the encryption is a hardware-based encryption.

6. The system of claim 1, wherein the encrypted data packet is used to communicate in an avionics system.

7. A method for decryption, the method comprising:
   receiving an encrypted data packet, wherein the data packet includes a random key address and encrypted data, wherein the random key address is a 12-bit random key address;
   obtaining a pre-stored key using the random key address;
   determining an arrangement of the pre-stored key used during encryption based on the random key address and a first enable signal;
   selecting a dynamic logic operation used during encryption based on the random key address and a second enable signal;
   determining an arrangement of portions of the encrypted data used during encryption based on the random key address and a third enable signal, wherein the first enable signal, the second enable signal and the third enable signal is determined by a dynamic encryption selector; and
   combining the arrangement of the pre-stored key with the arrangement of the portions of the encrypted data using the selected dynamic logic operation to decrypt the encrypted data.

8. The method of claim 7, wherein the random key is generated at a different device.

9. The method of claim 8, wherein a first portion of the random key address is used to generate key placement logic to arrange portions of the pre-stored key and the first portion of the random key address is used to perform byte placement of the combined data.

10. The method of claim 9, wherein a second portion of the random key address is used to generate a dynamic logic operator used to decrypt the encrypted data.

11. The method of claim 10, wherein a third portion of the random key address is used to generate the first enable signal, the second enable signal, and a third enable signal, wherein the first portion, the second portion, and the third portion of the random key do not overlap.

12. The method of claim 7, wherein the decryption is a hardware-based decryption.

13. The system of 7, wherein the decrypted data packet is used to communicate in an avionics system.

14. A system comprising:
   a transmitter configured to:
      generate a random key address;
      obtain a pre-stored key using the random key address;
      re-arrange portions of the pre-stored key based on the random key address and a first enable signal;
      select a dynamic logic operation based on the random key address and a second enable signal;
      receive data for encryption;
      combine portions of the received data for encryption with the re-arranged portions of the pre-stored key using the dynamic logic operation to produce encrypted data;

re-arrange portions of the encrypted data based on the random key address and a third enable signal, wherein the first enable signal, the second enable signal and the third enable signal is determined by a dynamic encryption selector; and combine the re-arranged portions of the encrypted data with the random key address into an encrypted data packet for transmission, wherein the transmitter further comprises a random number generator to generate a 12-bit random key address; and a receiver configured to:
receive the encrypted data packet, wherein the data packet includes the random key address and the encrypted data;

obtain the pre-stored key using the random key address;

determine an arrangement of the pre-stored key used the transmitter during encryption based on the random key address and the first enable signal;

select a dynamic logic operation used by the transmitter during encryption based on the random key address and the second enable signal;

determine an arrangement of portions of the encrypted data by the transmitter used during encryption based on the random key address and the third enable signal; and combine the arrangement of the pre-stored key with the arrangement of the portions of the encrypted data using the selected dynamic logic operation to decrypt the encrypted data.

15. The system of claim 14, wherein a first portion of the random key address is used to generate key displacement logic to re-arrange portions of the pre-stored key and the first portion of the random key address is used to perform byte displacement of the combined data.

16. The system of claim 15, wherein a second portion of the random key address is used to generate a dynamic logic operator used to encrypt the data.

17. The system of claim 16, wherein a third portion of the random key address is used to generate the first enable signal, the second enable signal, and a third enable signal, wherein the first portion, the second portion, and the third portion of the random key do not overlap.

18. The system of claim 14, wherein the encryption is a hardware-based encryption, wherein the decryption is a hardware-based decryption.

* * * * *